United States Patent [19]
Johnson, III

[11] Patent Number: 5,167,552
[45] Date of Patent: * Dec. 1, 1992

[54] TEXTURED WATER SPORTS BOARD

[75] Inventor: Joseph A. Johnson, III, Madison, Ga.

[73] Assignee: Wellington Leisure Products, Inc., Madison, Ga.

[*] Notice: The portion of the term of this patent subsequent to Oct. 1, 2008 has been disclaimed.

[21] Appl. No.: 627,213

[22] Filed: Dec. 13, 1990

Related U.S. Application Data

[63] Continuation-in-part of Ser. No. 473,423, Feb. 1, 1990, Pat. No. 5,052,963.

[51] Int. Cl.⁵ .............................................. B63B 23/02
[52] U.S. Cl. .................................... 441/74; 114/67 R
[58] Field of Search ............................ 441/65, 68, 74; 114/67 R, 67 A

[56] References Cited

U.S. PATENT DOCUMENTS

| | | |
|---|---|---|
| 632,738 | 9/1899 | O'Hara . |
| 2,914,335 | 11/1959 | Rivard . |
| 3,077,617 | 2/1963 | Steffel . |
| 3,408,086 | 10/1968 | Bennett . |
| 3,428,979 | 2/1969 | Johnson . |
| 3,761,980 | 10/1973 | Silverstein . |
| 3,827,096 | 8/1974 | Brownson . |
| 3,874,315 | 4/1975 | Wright . |
| 3,918,114 | 11/1975 | Schmitt . |
| 4,118,050 | 10/1978 | Schnurrenberger . |
| 4,178,012 | 12/1979 | Roth et al. . |
| 4,223,909 | 9/1980 | Danner et al. . |
| 4,323,265 | 4/1982 | Benner . |
| 4,440,418 | 4/1984 | Staufer . |

FOREIGN PATENT DOCUMENTS 3039898 5/1982 Fed. Rep. of Germany .

*Primary Examiner*—Jesûs D. Sotelo
*Attorney, Agent, or Firm*—Kennedy & Kennedy

[57] ABSTRACT

The bottom and side surfaces of a water sports board are textured with dimples measuring four to six thousands of an inch deep and a density of 80 to 160 dimples per square inch.

10 Claims, 3 Drawing Sheets

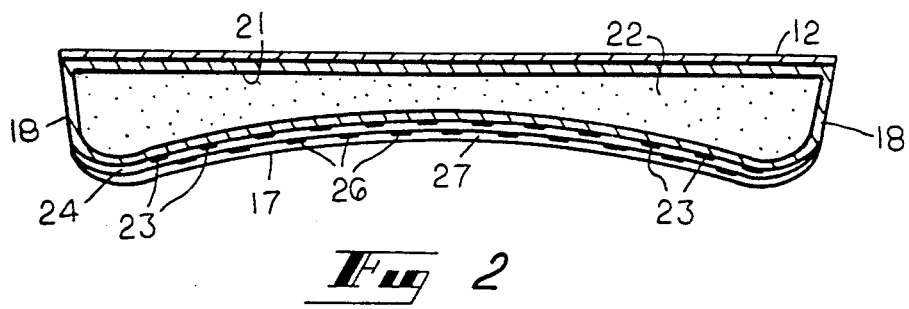
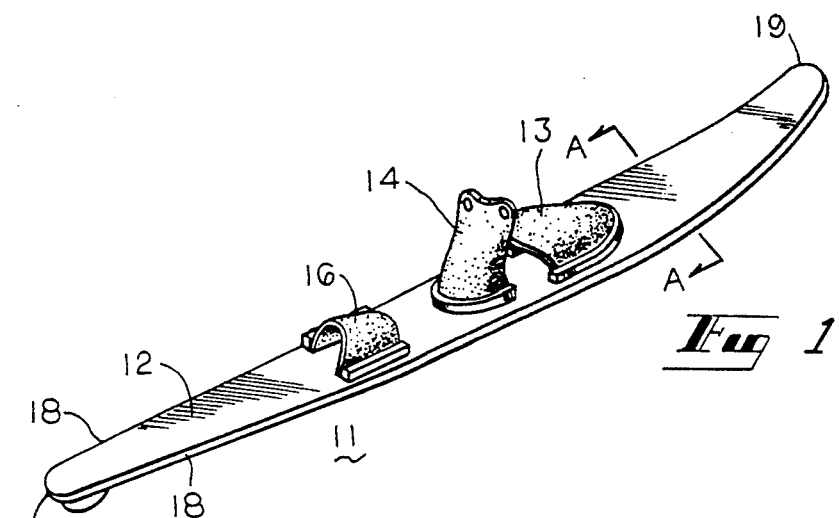
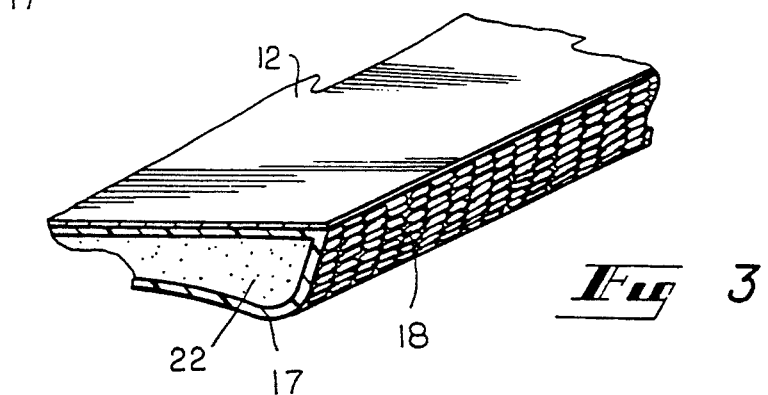
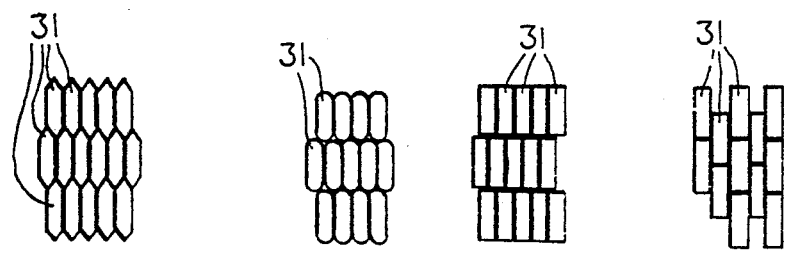

TEXTURED WATER SPORTS BOARD

This is a continuation-in-part of application Ser. No. 473,423 filed Feb. 1, 1990, now U.S. Pat. No. 5,052,963 issued Oct. 1, 1991.

TECHNICAL FIELD

This invention relates to water sports boards such as skis, surf boards, knee boards, wind surfers, and the like designed for movement over water or other viscous or liquid media, and, more particularly to a contact surface treatment for such devices for enhancing the performance thereof.

BACKGROUND OF THE INVENTION

The contact surface treatment of, for example, skis, to improve their performance, is well known in the art. It has been found that the normal smooth bottom on such devices does not produce the best results, such a bottom introducing a viscous drag factor that is undesirable. Efforts to reduce the drag on the surface of the ski that contacts the supporting medium have primarily been directed to creating a three-dimensional surface having a plurality of sloped portions, with the slope oriented in the intended direction of travel of the ski. One example of such a structure is shown in U.S. Pat. No. 3,408,086 of Bennett wherein overlapping scales are formed on the bottom of the ski which function as the contact surface. The scales are sloped to reduce friction or drag. Adjacent scales form a series of groove-like configurations which enhance the directional stability of the ski and enable the operator to exercise a good degree of control, especially in turns. Such a structure however is unusually complex and is subject to compaction of the material over which the ski is moving. This compaction is reduced by not extending the scale pattern all of the way out to the edges of the ski, but at the cost of leaving the edges of the ski untreated. Thus the advantages gained from the treatment are not available for high performance skiing involving numerous turns and rapid changes of direction where the ski edges are called upon to function as contact surfaces.

Variations on the scale construction are shown in U.S. Pat. Nos. 4,323,265 of Benner, 4,178,012 of Roth et al, 3,874,315 of Wright and 2,914,335 of Rivard. Nevertheless, all of the foregoing prior art arrangements rely upon sloping surfaces to decrease friction or drag, which are, in most cases, unduly complex and difficult to form, and are not readily applicable to the ski edges or to the edges of water sports boards such as surf boards, knee boards and wind surfers.

Another approach to reducing drag is based upon the catamaran principle, wherein the contact surface of the ski or other device is formed with two or more longitudinally extending ribs. Such a configuration, examples of which are shown in U.S. Pat. Nos. 3,428,979 of Johnson, 3,761,980 of Silverstein, 3,827,096 of Brownson and 3,077,617 of Steffel, reduces the area in contact with the ski supporting snow or water, thereby reducing drag, and enhances the longitudinal stability of the device. As in the case of the sloping surfaces or scales, there is no treatment of the ski edges. Hence these arrangements are unsuitable for competition or high performance type skis and boards. In addition, these ribs often tend to resist changes in direction, which makes the ski or board unsuitable for competitive use.

SUMMARY OF THE INVENTION

The principles of the present invention are applied to a preferred embodiment which comprises a water ski for use in high performance applications, such as competition events. The water ski comprises a generally flat upper surface and a concave lower, water contact surface which also defines the ski edges or sides. In accordance with principles of the present invention, both the ski sides and the ski bottom are considered to constitute the contact surface, and are textured with a pattern of elongated dimples, approximately four to six thousandths of an inch (mils) deep. The dimples may be in the form of elongated hexagons, rectangles, or ovals, or other suitable shape, interleaved with each other so that succeeding rows of dimples are laterally offset from the preceding and following rows, in the manner of a honeycomb. The density of the dimple pattern is within the range of 80 to 160 dimples per square inch. The texture surface does not, of itself, impart significant directional stability, hence it is not necessary that the dimples be oriented in any particular direction. The concavity of the ski bottom does afford a degree of directional stability sufficient for competition skiing, where a high degree of directional stability in neither necessary nor desirable.

In competitive water skiing, such as slalom skiing, the rapidly occurring turns and changes in direction require that the ski edges often perform as the contact surface. Thus it is desirable that a smooth transition takes place when the skier goes from upright position to a nearly horizontal position as he or she leans into a turn. When this occurs, the ski contact surface changes from the bottom of the ski to the edge of the ski and then back as the skier emerges from the turn. The dimpled texture of the ski contact surface creates a cushion of air between the water and the ski, whether the ski is riding on the ski bottom or is upon its edge. Hence there is no change in resistance or drag as the skier negotiates a slalom course. This cushion of air is analogous to the phenomenon known as "hydroplaning" in automobile tires, wherein tire contact with the road is greatly reduced on wet pavement at high speeds due to an air cushion build up. With a similar effect on the skis, drag is greatly reduced, as is "chatter", a phenomenon occurring in rough water which impairs ski performance.

The invention is also applicable to water sports boards such as surf boards, knee boards and wind surfer boards. These boards have an upper surface and a lower surface, a front end and a rear end, and side edges. The lower surface and sides form a substantially continuous contact surface which extends substantially the entire length of the board. The contact surface is textured with a pattern of dimples that have a depth of approximately four to six thousandths of an inch.

DESCRIPTION OF THE DRAWINGS

FIG. 1 is a perspective view of a water ski embodying principles of the present invention.

FIG. 2 is a cross-sectional view of the ski of FIG. 1 taken along the line A—A of FIG. 1.

FIG. 3 is a fragmented, perspective view of the ski of FIG. 1.

FIGS. 4 through 7 are diagrammatic views of different texture patterns for use with the ski of FIG. 1.

DETAILED DESCRIPTION

Figure 8:
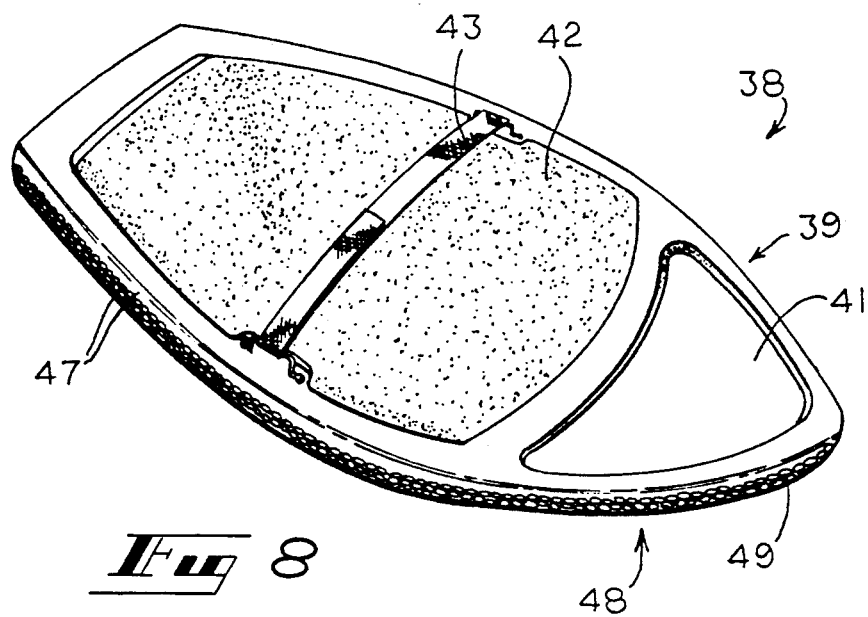
FIG. 8 is a perspective view of the top side of a knee board type water sports board embodying principles of the present invention.

With reference next to the drawing, in FIG. 1 there is shown a water ski 11 embodying principles of the invention. Ski 11 has an upper surface member 12 upon which are mounted foot restraints 13, 14 and 16 preferably made of rubber or other flexible material. The material forming member 12 is preferably semi-rigid plastic material of, for example, the material known as ABS which is commonly used in water skis. Ski 11 has a contact surface 17 and side edges 18, 18 and an up-turned front tip 19.

Attached to the underside of member 12, as by epoxy cement, is a hollow fiberglass member 21 which is filled with a core 22 of cellular material such as, for example, polyurethane foam. Member 21 is formed with a concave bottom along which are attached a plurality of spaced strips 23, 23 of Kevlar or graphite which extend from the tip of the ski for approximately two-thirds of the length thereof. Strips 23 are flexible and rebound readily from shocks to the ski during use, while strengthening the ski. A fiberglass layer 24 covers strips 23 and is cemented to the bottom of member 21, preserving the concave shape, as shown. A plurality of ceramic strips 26, 26 are attached to the bottom of layer 24, and like strips 23, extend approximately two-thirds of the length of the ski from the tip 19 thereof. Ceramic strips 26, 26 strengthen the ski and preserve its shape under stresses, while functioning to absorb shocks during use. A second fiberglass layer 27 covers the strips 26, 26 and is affixed to the bottom of layer 24, preserving the concavity, as shown. The strips 23, 23 and 26, 26 impart a stiffness to the front portion of the ski while leaving the rear portion flexible, or "soft", which is desirable in high performance skis.

The entire assembly shown in FIG. 2 has the various contacting surfaces coated with epoxy and is formed into a unitary structure by being placed in a heated pressure mold until the epoxy is cured.

In accordance with the present invention, that portion of the mold defining the bottom 17 and sides 18, 18 of the ski is textured. During the pressuring and heating of the ski this texture is imparted to the bottom 17 and sides 18, 18, as shown in FIG. 3. Preferably, the textured surfaces imparted to the ski extend the entire length thereof, along both bottom and sides, with the texture pattern extending completely across the bottom 17 and up the sides 18, 18 as seen in FIG. 3.

The texture pattern comprises a plurality of dimples, approximately four to six mils deep, of any of a number of shapes, as shown in FIGS. 4 through 7. In FIG. 4, the dimples 31 are in the shape of elongated hexagons, with adjacent rows offset to form a honeycomb pattern, as shown. An alternative dimple shape is shown in FIG. 5 wherein the dimples 31 are elliptical or oval in shape, and are interleaved by the transverse offset of adjacent rows. FIGS. 6 and 7 show dimples 31 in the shape of rectangles, with adjacent rows offset, as shown in FIG. 6, or interleaved in the manner of a brick walk, as shown in FIG. 7. In the pattern of FIG. 7, adjacent rows of dimples 31 are transversely offset as well as laterally adjacent dimples being longitudinally offset from each other. In each of the patterns shown, the density of the dimples is within the range of 80 to 160 dimples per square inch.

It has been found that a dimple pattern such as that shown in FIG. 4, with the dimples approximately six mils deep and having a density of approximately 120 dimples per square inch, produces a material reduction in the drag of the ski on the water, and that in sharp turns where the edge of the ski becomes the contact surface, there is no discernible increase in drag. In slalom type water skiing, a hole is created in the sharp turn, and the ski of the present invention accelerates out of the hole quickly. In rough or choppy water, a ski tends to "chatter" as it passes across the chop, or as it passes across the boat wake. This chatter reduces performance, and is disconcerting to the skier. With the structure of the present invention, "chatter" is reduced to a manageable level with a minimum of decrease in performance or speed.

Verification tests were conducted using a 1988 Correct Craft Ski Nautique ski boat. A 60 foot ski rope was tied to a measuring device that itself was coupled to the boat stern. The measuring device was a Bourdon Tube 30 lbs. strain gauge placed on a standard hydraulic 2' bore cylinder with a ⅝' diameter piston rod that netted a 2.835 square inch area.

Two skiers were pulled directly behind the boat at a constant speed of 36 mph in a linear direction using a 6 lbs. 12 oz. dimple ski and a 7 lbs. 3 oz. undimpled ski. A 130 lb. skier was found to produce a 57.551 lb. force on the gauge but only 52.164 lbs with the dimple ski. A 210 lbs. skier produced a force of 87.885 lbs. with an undimpled ski and 80.514 lbs with the dimple ski.

Figure 9:
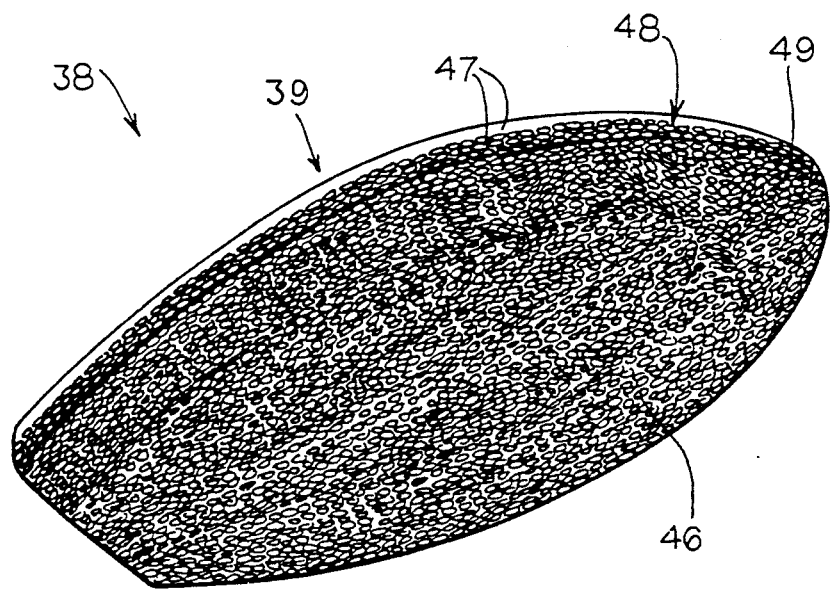
FIG. 9 is a perspective view of the bottom of the knee board of FIG. 8.

With reference next to FIGS. 8 and 9 there is shown a knee board type water sports board 38 having an elongated shell 39. Shell 39 has an upper surface 41 upon which a support pad 42 and a restraining strap 43 are mounted. Shell 39 also has a bottom surface 46 and right and left sides 47 forming a substantially continuous contact surface 48, an up-turned front 49 and a rear end.

The shell is manufactured by conventional blow molding and rotational molding techniques which use multiple piece molds. One mold has a negatively textured interior surface shaped to form the bottom surface 46 and a lower portion of the sides 47. The other mold piece has an interior surface shaped to form the remainder of the sides 47 and the upper surface 41 of the shell. Molten plastic is injected into the mold thereby covering its interior surfaces. The molten plastic is cooled on the mold and thereby hardened to form the shell 39. Finally, the mold pieces are separated and the shell removed from the mold.

In accordance with the present invention, that portion of the mold defining the bottom surface 46 and a lower portion of the sides 47 of the shell 39 is textured with a pattern which comprises a plurality of dimples, as previously described. Preferably, the textured surfaces of the shell extend the entire length thereof, along both bottom and sides, with the texture pattern extending completely across the bottom 46 and a lower portion of the sides 47 including the front and rear ends.

Figure 10:
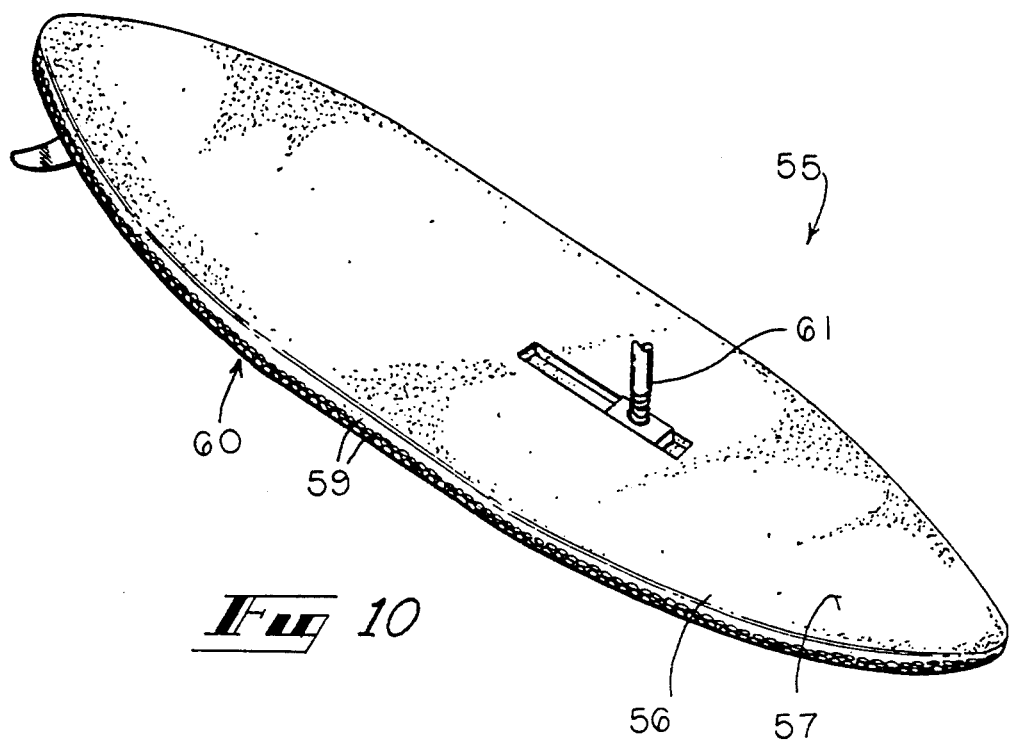
FIG. 10 is a perspective view of the top side of a surf board or wind surfer board type water sports board embodying principles of the present invention.
Figure 11:
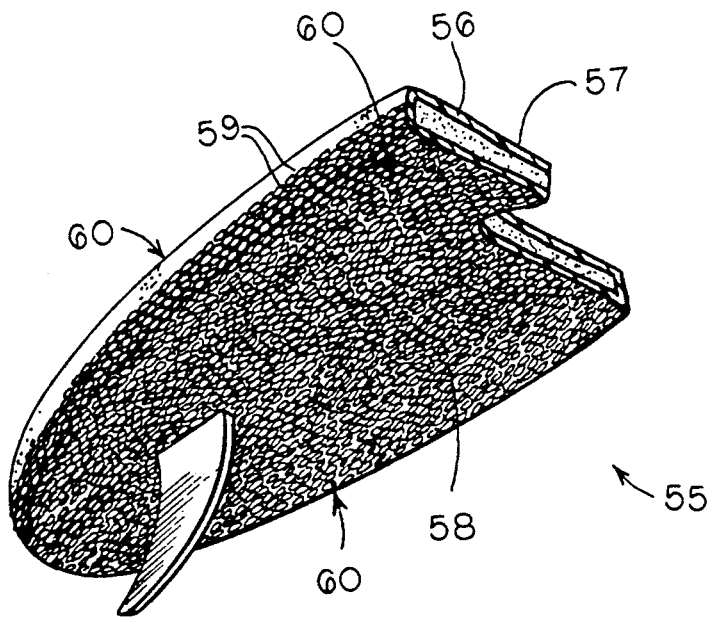
FIG. 11 is a perspective view of a rear end portion of the bottom of the surf board of FIG. 10.

Finally with reference to FIGS. 10 and 11 there is shown a surf board type water sports board 55. It should be noted that this type of board is also used as a wind surfer board, the difference being that a sailing rig 61 is mounted to the board, a bottom portion of which is shown in FIG. 10. The board has an elongated shell 56 which has an upper surface 57, a bottom surface 58 and sides 59. The bottom surface 58 and sides 59 form a substantially continuous water contact surface 60.

These shells are preferably manufactured in two ways. One way is to layer fiberglass about a foam core, similar to the way in which the water ski is manufactured as previously described. The other way is to form a plastic shell in the same manner as previously described in reference to the manufacture of knee boards.

Again, in accordance with the present invention, the bottom surface 58 and a lower portion of the sides 59 are textured with a pattern of dimples, as previously described. Preferably, the textured surfaces imparted to the shell extend the entire length thereof, with the texture pattern extending completely across the bottom 58 and the lower portion of the sides 59, including the front and rear ends. The texture pattern comprises a plurality of dimples as previously described.

It thus is seen that water skis and water sports boards are now provided with reduced drag. It should be understood that the just described embodiments merely illustrate principles of the invention in preferred forms. Many modifications, additions and deletions may be made without departure from the spirit and scope of the invention as set forth in the following claims.

I claim:

1. A water sports board such as a surf board, a knee board or a wind surfing board comprising an elongated member having an upper surface and a lower surface, a front end and a rear end, and first and second sides, said lower surface and at least lower portions of said sides forming a substantially continuous contact surface, said contact surface being textured with a pattern of dimples with each dimple having a depth of approximately four to six thousandths of an inch, said contact surface extending substantially the entire length of said water sports board.

2. The water sports board as claimed in claim 1 wherein the density of said dimples in said pattern is in the range of 80 to 160 dimples per square inch of contact surface.

3. The water sports board as claimed in claim 2 wherein the density of said dimples in said pattern is 120 dimples per square inch of contact surface.

4. The water sports board as claimed in claim 1 wherein said dimples in said pattern are arranged in rows with adjacent rows being laterally offset from each other.

5. The water sports board as claimed in claim 4 wherein said dimples are in the shape of elongated hexagons.

6. The water sports board as claimed in claim 4 wherein said dimples are in the shape of ellipses.

7. The water ski as claimed in claim 4 wherein said dimples are in the shape of longitudinally oriented rectangles.

8. The water sports board as claimed in claim 7 wherein laterally adjacent dimples are longitudinally offset from each other.

9. The water sports board as claimed in claim 1 wherein substantially the entire lower portion of said first and second sides is textured with said dimples.

10. The water sports board as claimed in claim 1 wherein substantially the entire surface of said contact surface is textured with said dimples.

* * * * *